W. Wright,
Clutch.
Nº 9,043. Patented June 15, 1852.
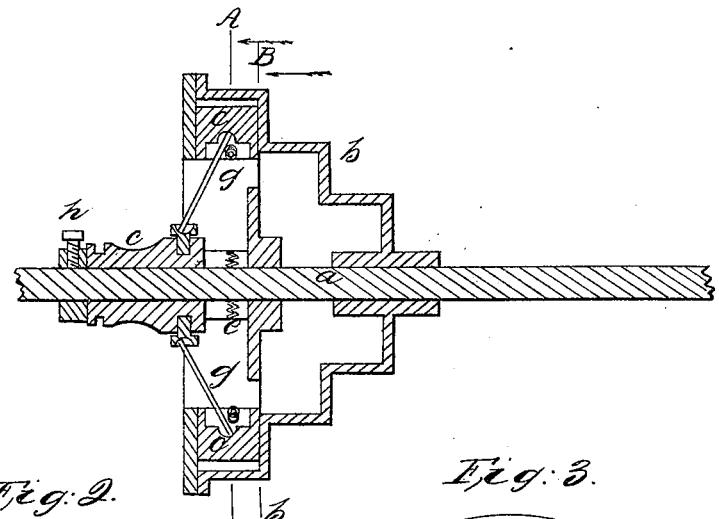
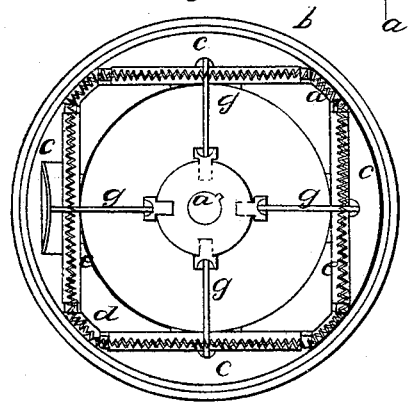
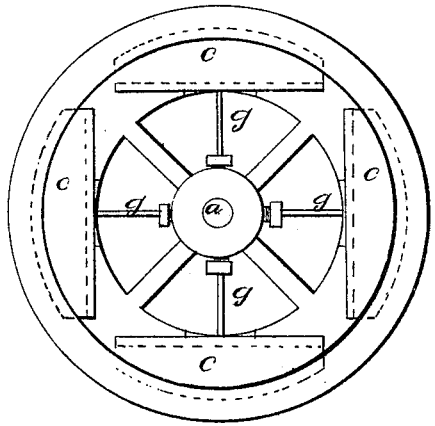

UNITED STATES PATENT OFFICE.

WENDELL WRIGHT, OF NEW YORK, N. Y.

FRICTION-CLUTCH.

Specification of Letters Patent No. 9,043, dated June 15, 1852.

*To all whom it may concern:*

Be it known that I, WENDELL WRIGHT, of New York, N. Y., have invented a certain new and useful Improvement in Fast and Loose Pulleys, and that the following is a full, clear, and exact description thereof, reference being had to the accompanying drawings, making part of this specification, in which—

Figure 1, is a vertical section taken through the axis of the shaft; Fig. 2, a cross section taken at the line A *a*, Fig. 1; Fig. 3, a cross section taken at the line B *b* of Fig. 1.

The same letters indicate like parts in all the figures.

The object of my invention is to overcome difficulties sometimes attendant upon the continued rotation of a pulley and consequently of the shaft to which it is attached when the belt is shifted from the fast to the loose pulley in the ordinary way, which continued rotation is due to the momentum of the pulley and shaft and the machinery. Sometimes in machines especially in cotton machinery and others great speed is attained. Their continued rotation due to the momentum is a source of serious inconvenience.

My object therefore is to produce a perfect and sudden stop, and with this view my invention consists in the use within the pulleys of four (more or less) segments of metal taken from a circle of the same or nearly the same diameter as the inner circle of the pulley, said segments being united together by helical or other springs and each connected to a sliding thimble on the shaft by a diagonal brace forming an angle with the shaft, so that when the thimble is moved by a lever or otherwise, toward the pulley the braces force the segments against the inner surface of the pulley and thus produce the required friction.

In the accompanying drawings *a* represents the shaft upon which is placed the loose pulley *b*, which is made in the usual manner. Within the pulley are placed the four segments *c* of a circle of the same or nearly the same diameter as the inner circle of the pulley. These segments are connected together at their adjacent ends by the helical springs *d*, which operating in connection with the helical springs *e*, cause the segments to preserve their proper positions when not in operation. Before slipping the belt onto the pulley, the thimble *f* is moved by a lever, or otherwise, toward the face of the pulley. The braces *g* are thereby caused to force the segments *c* against the inner face of the pulley, so as to cause sufficient friction, and the thimble is retained in place by the set screw *h*. The belt may then be slipped on and the shaft rotated with the pulley made fast in this way. When it is desired to arrest the momentum of the machinery suddenly, the set screw *h* is loosened, the thimble slides back, and the friction created by the segments is withdrawn, and the pulley becomes at once a loose pulley.

I do not claim as my invention making a loose pulley fast with its shaft by means of the friction of internal segments; but What I do claim as my invention and desire to secure by Letters Patent, is—

Operating the segments for producing friction on the inner surface of a loose pulley, by means of a thimble on the shaft of the pulley connected with the segments by diagonal rods or braces, substantially as described.

WENDELL WRIGHT.

Witnesses:
WM. H. BISHOP,
CHAS. N. BAMBURGH.